(12) United States Patent
Toskala et al.

(10) Patent No.: US 6,269,126 B1
(45) Date of Patent: Jul. 31, 2001

(54) DATA COMMUNICATION AND RADIO SYSTEM

(75) Inventors: Antti Toskala, Helsinki; Harri Holma, Espoo; Kari Rikkinen, Nummenkylä, all of (FI); Kari Pehkonen, Tokyo (JP)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/424,081
(22) PCT Filed: Mar. 25, 1999
(86) PCT No.: PCT/FI99/00248
§ 371 Date: Feb. 8, 2000
§ 102(e) Date: Feb. 8, 2000
(87) PCT Pub. No.: WO99/53628
PCT Pub. Date: Oct. 21, 1999

(30) Foreign Application Priority Data

Mar. 27, 1998 (FI) ..................................................... 980703

(51) Int. Cl.[7] .............................. H04L 23/02; H04L 5/12
(52) U.S. Cl. ........................... 375/265; 375/341; 370/538
(58) Field of Search ................................. 375/265, 341; 370/537, 538, 540, 542, 543, 544

(56) References Cited

U.S. PATENT DOCUMENTS 4,907,233  3/1990  Deutsch et al. .
5,369,636 * 11/1994  Ueno et al. ............................ 370/538
5,541,955 *  7/1996  Jacobsmeyer ......................... 375/222

FOREIGN PATENT DOCUMENTS

| 0634840 | 7/1994 | (EP) . |
| 06 34840 | 1/1995 | (EP) . |
| 10051423 | 2/1998 | (JP) . |
| 9632781 | 11/1995 | (WO) . |
| 9624206 | 1/1996 | (WO) . |
| 96/24206 A1 | 8/1996 | (WO) . |
| 96/32781 | 10/1996 | (WO) . |

OTHER PUBLICATIONS

Cideciyan et al., Concatenated Reed–Solomon/Convolutional Coding for Data Transmission in CDMA–Based Cellular Systems, IEEE Transactions on Communications, vol. 45, No. 10, Oct. 1997, 1291–1303.

* cited by examiner

Primary Examiner—Chi Pham
Assistant Examiner—Phuone Phu
(74) Attorney, Agent, or Firm—Pillsbury Winthrop LLP

(57) ABSTRACT

Provided is a method and system for a radio system including at least one base station and terminal equipment including a receiver and a transmitter. The transmitter is structured and arranged to independently adjust a symbol rate of at least two signals and combine the two signals after adjusting the symbol rate. The transmitter then transmits the combined signal along one physical path. By adjusting the signal rate before combining the two signals, the transmitter optimizes the signal qualities of each of the signals.

18 Claims, 2 Drawing Sheets

DATA COMMUNICATION AND RADIO SYSTEM

This application is the national phase of international application PCT/FI99/00248 filed Mar. 25, 1999 which designated the U.S.

FIELD OF THE INVENTION

The invention relates to a data transmission method, which is used in a radio system comprising at least one base station and terminal equipment comprising a receiver and a transmitter and communicating with each other over at least one physical channel.

The invention further relates to a radio system, particularly a radio system comprising at least one base station and terminal equipment comprising a receiver and a transmitter and communicating with each other over at least one physical channel.

BACKGROUND OF THE INVENTION

Present mobile telephone systems attempt to provide the user with increasingly versatile services. This goal is shared by IMT-2000 (International Mobile Telecommunications for the Year 2000) services which aim to offer high-quality speech/audio signal transmission, high-rate data transfer, photograph transmission and video image transmission. In addition, the IMT-2000 service encompasses interactivity, multimedia electric mail, video conferences and target location determination, for example.

Transferring different data requires different symbol rate and signal transmission power. In the present radio systems the symbol rate is not optimized for the changing channel conditions since the symbol rate of several signals cannot be adapted in one physical channel. If, for example, two service signals transmitted over the same physical channel have differing quality requirements when received and the signals act differently when the delay profile of the channel changes, problems affecting the power level of the two signals occur. Such a problem typically arises when Reed-Solomon coding and convolution coding are used together. When the channel delay profile changes, a situation may arise when the first signal in accordance with the example is barely acceptable in terms of quality, while the other signal is of unnecessarily high quality. The situation is particularly critical when a service signal only requiring a low symbol rate forces a service signal requiring a high symbol rate to use extra transmission power. The prior art solutions fail to resolve this disparity. Unresolved, the disparity will cause interference over the whole area of the radio system.

BRIEF DESCRIPTION OF THE INVENTION

An object of the invention is thus to provide a method and a radio system implementing the method so as to solve the above problems and balance the signal quality. This is achieved by a method of the type described in the introduction, the method being characterized by the transmitter transmitting at least over one physical channel at least two signals having differing quality requirements when received, and the transmitter changing, if necessary, signal-specifically the symbol rates of the signals used over the physical channel in order to meet the quality requirements.

The radio system of the invention is characterized by the transmitter being arranged to transmit over one physical channel at least two signals having differing quality requirements when received, the transmitter therefore comprising at least means for changing the symbol rate of the signals signal-specifically in order to meet the quality requirements, and combination means for combining the signals in the same physical channel.

A plurality of advantages can be achieved with the method and system of the invention. The desired quality requirements of a signal to be received can be balanced, which enables optimized transmission power be used. The result is less interference in the radio system.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

The solution of the invention is suited particularly for WCDMA (Wideband Code Division Multiple Access), UMTS (Universal Mobile Telephone System) and IMT-2000 radio systems. Hence, the invention is suitable for at least TDMA-based (Time Division Multiple Access) and CDMA-based radio systems.

Figure 1:
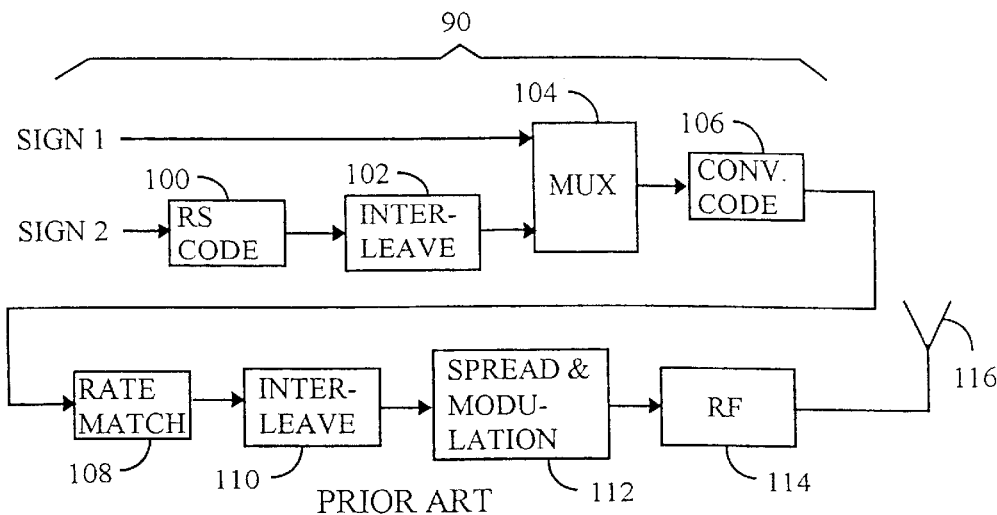
FIG. 1 shows a prior art transmitter.

Examine first by means of FIG. 1 how data is transmitted in accordance with the prior art. In the present example, a transmitter 90 only transmits a signal 1 and a signal 2 over the same physical channel, but the same principle applies also to three or more signals to be transmitted. The signals typically have differing quality standards when received. A carrier-to-interference ratio or for instance a bit error rate BER can be used as the quality standard. The BER of the signal 1 is for example $BER1=e^{-3}$ and the BER of the signal 2 is $BER2=e^{-6}$. Since the quality requirements are signal-specific, the signals should be transmitted at different transmission powers/symbol rates. The signal 2 to be transmitted is first encoded by for example Reed-Solomon coding at means 100. This coding can also be some other coding. Next, at means 102, the signal 2 is interleaved, in other words the bits or symbols of the signal are rearranged such that the signal 2 becomes more tolerant of fadings. The signal 1 and the signal 2 are combined into a combined signal at a combination means 104, which can be a multiplexer. Next, the combined signal is convolution-coded at a coder 106. The symbol rate and thus also the transmission power—of the combined signal is changed by removal coding or repetition coding, if necessary, at means 108. The removal coding or repetition coding increases or decreases the number of bits to be transmitted, affecting the two signals in a similar manner. The signal is further interleaved at means 110. Eventually, the signal is modulated into a radiofrequency signal at radio frequency means 114 in a manner obvious to one skilled in the art, and the radiofrequency signal is transmitted by an antenna 116. The fact that only one shared unit 108 is provided to adapt the symbol rate prevents the signal power levels from being optimized.

Figure 2:
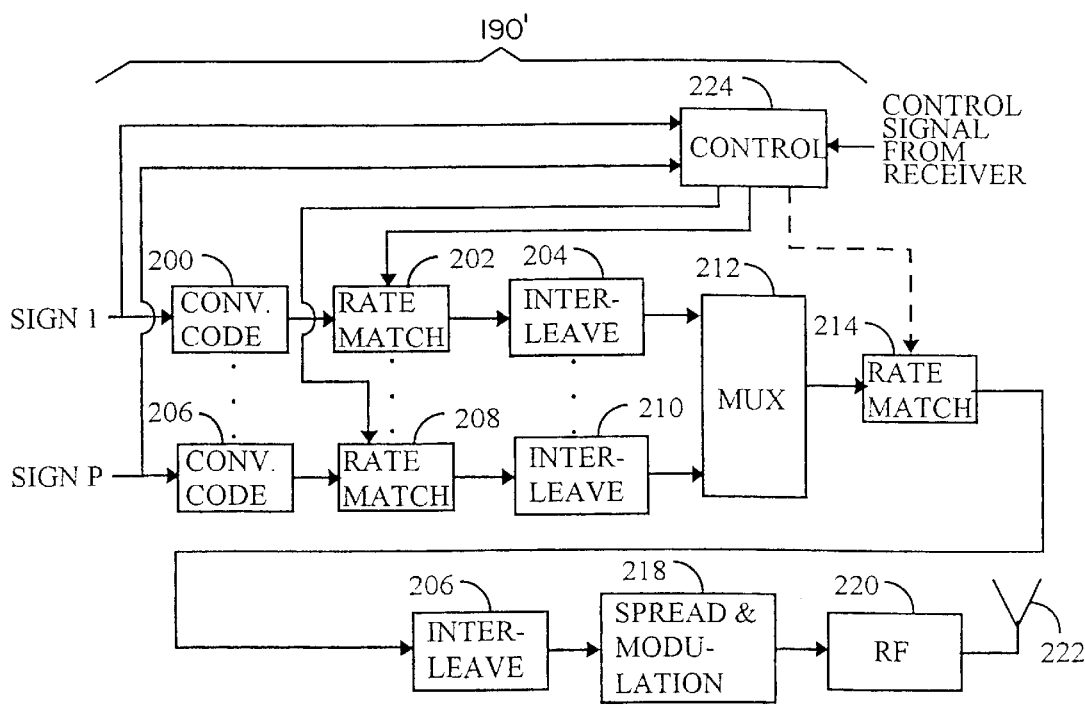
FIG. 2 shows a transmitter of the invention.

Examine now a solution of the invention by means of FIG. 2. A transmitter 190 transmits a total of P signals having differing quality requirements. The number P of the signals to be transmitted is two or more. Before being combined, a signal 1 is encoded by a coder 200, the symbol rate is adapted at means 202 and interleaved at means 204. Other signals are processed in a similar manner; a signal P is thus encoded at a coder 206, the symbol rate is adapted at means 208 and interleaved at means 210. Although being typically employed in a radio system transmitter, the coders 200, 206 and the interleaving means 204, 210 are irrelevant to the invention. Hence, in addition to or instead of the coders 200, 206 and the interleaving means 204, 210, the solution of the invention can further comprise other signal processing means. Essential in the inventive solution is that the signals in this embodiment at least have the unique means 208 and 210 affecting the symbol rate which change the symbol rate by removal coding and/or repetition coding, if necessary. Changing the symbol rate also changes the signal transmission power; changing the symbol rate is thus equivalent to changing signal transmission power. The signals are combined at a combination means 212, which is a multiplexer. In the solution of the invention, the symbol rate of the combined signal can be further changed at means 214, if necessary. The means 214 also performs removal coding and/or repetition coding. In the solution of the invention, it is not, however, necessary to change the symbol rate at this point. The subsequent operation of the transmitter 190 is irrelevant to the inventive solution. Typically, however, the signal is interleaved at means 206, spreading-coded and modulated in one or more manners at means 218, modulated into a radio-frequency signal at means 220, and transmitted via an antenna 222. Hence, at least two different signals that are usually associated with different services are transmitted over the same physical channel. A physical channel is here defined as a channel based on the use of one or more spreading codes.

In a preferred embodiment of the invention the symbol rate of the transmitter 190 can be controlled by a receiver. In such a case, a control signal (CONTROL SIGNAL FROM RECEIVER) is supplied from the receiver to a control unit 224 of the transmitter, the control unit controlling the blocks 202, 208 changing the symbol rate as instructed by the control signal. The control block 224 can also control the block 214 changing the symbol rate if such a block is in use at the transmitter 190. The signals 1 to P are also supplied to the control block 224, whereby the control block 224 knows the required symbol rate. Removal coding and/or repetition coding changing the symbol rate and the transmission power is performed both for the transmitter and the receiver in a known manner. Consequently, the change does not otherwise affect the data transmission.

Figure 3:
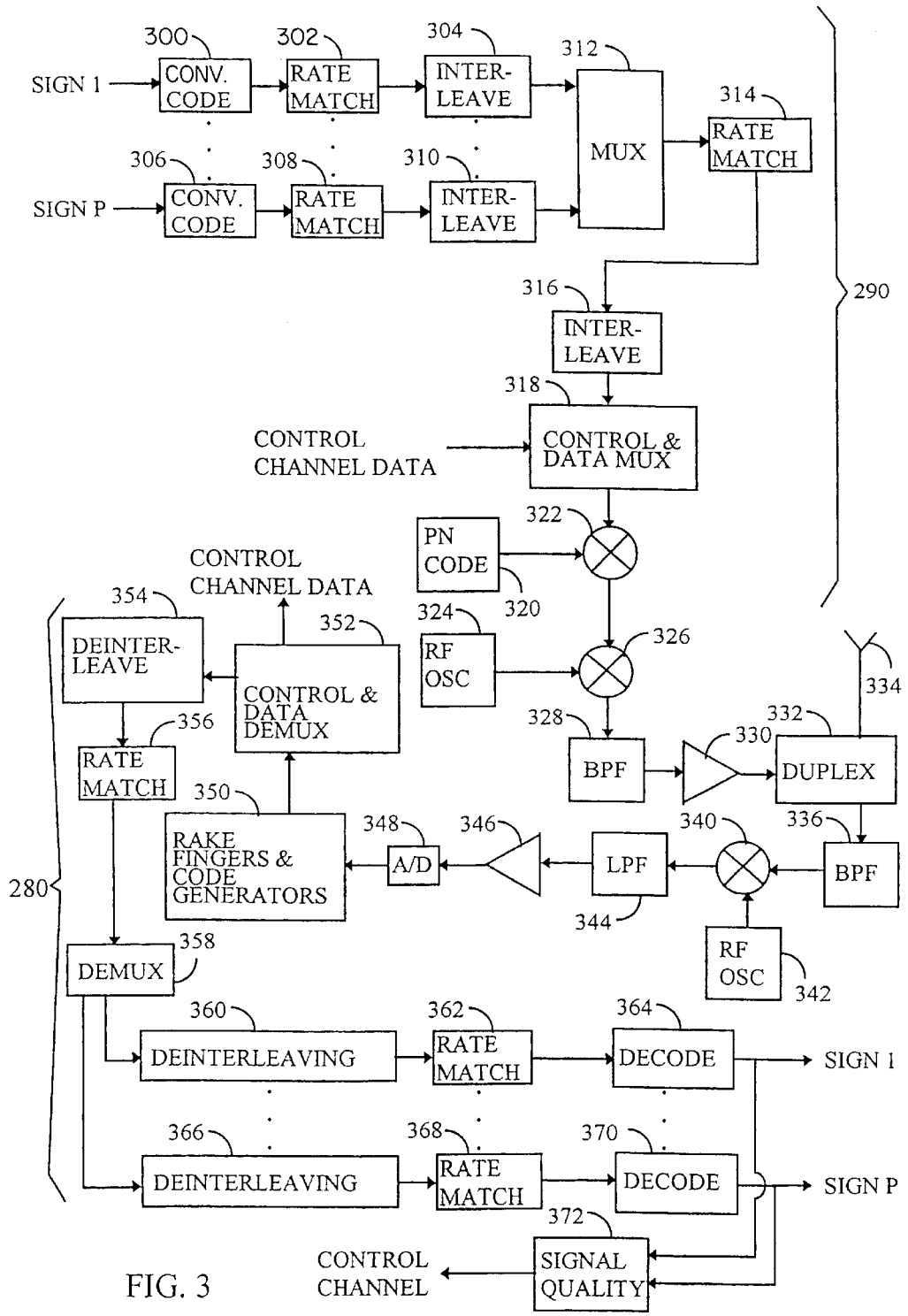
FIG. 3 shows a transceiver of the invention.

FIG. 3 shows the features of the inventive solution in greater detail. The base stations and terminal equipment of the radio system are transceivers, the block diagram of FIG. 3 showing such a transceiver in general. The transceiver transmits P signals, which a transmitter 290 first encodes at means 300, 306, adapts the symbol rates at means 302, 308, and interleaves at means 304, 310 as in FIG. 2. Henceforth, the signal processing also proceeds in accordance with FIG. 2, in other words the signals are combined by a combination means 312, the symbol rate of the combined signal is further adapted at means 314, and the combined signal is interleaved at means 316. Next, at a typical transmitter part 290, control data is added to the signal to be transmitted at means 318, preferably being a multiplexer. Next, the signal is spreading-coded, which is performed in such a manner that the signal is multiplied at a multiplier 322 by a spreading code supplied from a spreading code generator 320. The spreading-coded signal is modulated into a radiofrequency signal by multiplying at a multiplier 326 the signal by a carrier supplied from an RF oscillator 324 and by filtering the signal at a filter 328. The radio-frequency signal is amplified at an RF power amplifier 330 and transferred via a duplex-filter 332 to an antenna 334 to be transmitted.

In the solution of the invention, a receiver 280 operates in the following manner. The antenna 334 receives the signal, which is a combination signal consisting of several signals. The received signal propagates via the duplex-filter 332 to a filter 336, which only allows the desired band to pass. The filtered signal is demodulated by multiplying the signal at a multiplier 340 by the signal of a local oscillator 342, and low-pass-filtering the signal at a filter 344. Next, the aim is to keep the power level of the received signal unchanged with an AGC amplifier 346. The signal is changed to digital by an analogue/digital converter 348. Since the signal is a multipath-propagated signal, the aim is to combine the signal components propagated via different paths in a block 350 which, in accordance with the prior art, comprises a plurality of RAKE branches. The signal components received by the RAKE branches at different delays are searched by correlating the received signal with the spreading codes used, which are delayed by predetermined delays. When the signal component delays are found out, signal components belonging to the same signal are combined. Simultaneously, the spreading coding of the signal components is decoded. Next, the control signals and data signals included in the received signal are separated by demultiplexing at means 352. The signal part containing data is conveyed to be deinterleaved at means 354. Here, the interleaving of the block corresponding to the interleaving means 316 is thus deinterleaved. Next, at means 356, the signal undergoes an inverse operation of the symbol rate change corresponding to the transmitter block 314. Hence, if the transmitter block 314 has performed removal coding, the block 356 performs repetition coding of a corresponding extent. Next, the combination signal is divided into P signals at demultiplexing means 358. The interleaving of the first signal is deinterleaved at deinterleaving means 360, the symbol rate is inversely adapted in relation to the adaptation of the transmitter block 302 at means 362 and the signal coding is decoded at the means 362, in which case the signal 1 is available to the receiver. A similar procedure is repeated in connection with other demultiplexed signals; similarly, the interleaving of the signal P is deinterleaved at means 366, removal coding or repetition coding is performed at means 368, and the signal is decoded at means 370. The means 300, 306 of the transmitter usually perform convolution coding, the convolution coding being decoded by the means 364, 370 of the receiver.

The receiver 280 further comprises a block 372 measuring the signal quality. If any of the received signals does not meet the quality requirements or exceeds the quality requirements too dramatically, in other words deviates too much from a predetermined quality requirement, a signal controlling the symbol rate is supplied from the block 372 to the block 318 of the transmitter part for the control channel.

The solution of the invention is also suited for radio systems wherein the physical channel is based on bursts instead of spreading code(s), as is the case with the TDMA-based transmissions for example in a GSM radio system. In such a case, a plurality of service signals can be transmitted at an optimal power level in the same burst. The advantage of this is that the receiver does not need to receive separate signals from each service. This also applies to the TDMA/CDMA radio system wherein spreading coding is used within the burst. Hence, several different services can be simultaneously placed for the code or group of codes to be used in the burst. FIGS. 1 to 3 show transmitters and receivers using spreading coding. Truly TDMA-based transmitters and receivers are similar to the ones shown in FIGS. 1 to 3 as regards the rest of the blocks, but spreading coding is naturally ignored at the blocks 112, 218, the means 320 and 322 also being unnecessary. Furthermore, neither are the delays of the received signal caused by multipath-propagation searched on the basis of the spreading code at the block 350 in such a case. In the TDMA receiver, the block 350 performs equalization wherein the received signal is multiplied by an estimate of the impulse response of the channel. The impulse response estimate is formed, in turn, by means of a training sequence or another known sequence in a manner obvious to one skilled in the art. Both transmission and reception modes are employed in the TDMA/CDMA transceivers.

Although the invention is described above with reference to the example in accordance with the accompanying drawings, it is obvious that the invention is not restricted thereto but can be modified in various ways within the scope of the inventive idea disclosed in the attached claims.

What is claimed is:

1. A data transmission method used in a radio system including at least one base station and terminal equipment, the terminal equipment including at least a transmitter and a receiver, the transmitter and the receiver being adapted to communicate with each other over at least one physical channel, the method comprising:

receiving in the transmitter, at least two signals, each having a unique signal quality;

independently adjusting a symbol rate of the at least two received signals if a signal quality of one of the at least two received signals is different from a signal quality of the other of the at least two received signals by a predetermined amount, the adjusting compensating for the difference;

combining the at least two received signals to produce a combined signal; and transmitting the combined signal along the at least one physical path, wherein independently adjusting a symbol rate is performed prior to combining the at least two received signals.

2. The method of claim 1, wherein the transmitter employs at least one of removal coding and repetition coding.

3. The method of claim 2, wherein the removal coding and repetition coding are performed in a predetermined manner, wherein the change in the symbol rate does not interfere with transmission of the combined signal.

4. The method of claim 1, wherein the transmitter adjusts the symbol rate of each of the at least two received signals in such a way that a symbol rate of the combined signal is kept unchanged.

5. The method of claim 1, wherein the receiver indicates to the transmitter that a need exists to change the symbol rates of the at least two received signals when the quality of one or more of the at least two received signals does not meet a predetermined quality requirement at the receiver.

6. The method of claim 1, wherein the transmitter is configured to adjust, if necessary, the symbol rate of the combined signal.

7. The method of claim 1, further comprising the transmitter interleaving the at least two received signals.

8. The method of claim 1, wherein the transmitter is configured to perform at least one of convolution coding and Reed-Solomon coding of the at least two received signals.

9. The method of claim 1, wherein the signal qualities are signal-specific.

10. A radio system including at least one base station and terminal equipment, the terminal equipment including a receiver and a transmitter, the receiver and the transmitter being configured to communicate with each other over at least one physical channel, wherein the transmitter is structured and arranged to transmit at least two received signals over one physical path, each received signal having a unique signal quality, the transmitter comprising at least:

a symbol rate adjuster configured to independently adjust a symbol rate of each of the at least two received signals if a signal quality of one of the at least two received signals is different from a signal quality of the other of the at least two received signals by a predetermined amount; and a combiner configured to combine the at least two received signals to produce a combined signal for transmission along the at least one physical path;

wherein the symbol rate adjuster adjusts, if necessary, the symbol rate of at least one of the at least two received signals before the combiner combines the at least two received signals.

11. The radio system of claim 10, wherein the symbol rate adjuster is configured to employ at least one of removal coding and repetition coding.

12. The radio system of claim 11, wherein the at least one of the removal coding and repetition coding is known to the transmitter and the receiver.

13. The radio system of claim 10, wherein the symbol rate adjuster is configured to change the symbol rate of the at least two received signals prior to combination in such a way that the symbol rate of the combined signal is unchanged by operation of the symbol rate adjuster.

14. The radio system of claim 10, wherein the receiver is configured to measure the quality of the at least two received signals and to indicate to the transmitter that a need exists to change the symbol rates of the at least two received signals if the quality of one or more of the at least two received signals does not meet a predetermined quality requirement at the receiver.

15. The radio system of claim 10, wherein the transmitter is configured to change, if necessary, a symbol rate of the combined signal.

16. The radio system of claim 10 or 15, wherein the transmitter is configured to interleave the at least two received signals.

17. The radio system of claim 10 or 15, wherein the transmitter is configured to perform at least one of convolution coding and Reed-Solomon coding on the at least two received signals.

18. The radio system of claim 10, wherein the signal qualities are signal specific.

* * * * *